United States Patent [19]

Rummel

[11] Patent Number: 4,477,517
[45] Date of Patent: Oct. 16, 1984

[54] MULTILAYER SILICONE COATING

[75] Inventor: Mitzie K. Rummel, Secane, Pa.

[73] Assignee: E. I. Du Pont de Nemours and Company, Wilmington, Del.

[21] Appl. No.: 427,476

[22] Filed: Sep. 29, 1982

[51] Int. Cl.$^3$ .................. B32B 5/16; B32B 15/08
[52] U.S. Cl. .................... 428/324; 427/299; 427/302; 427/387; 427/409; 427/421; 427/427; 428/328; 428/331; 428/363; 428/447; 428/450
[58] Field of Search ............ 428/450, 324, 363, 447, 428/331, 403, 328; 427/299, 302, 387, 421, 427, 409

[56] References Cited

U.S. PATENT DOCUMENTS

| | | | |
|---|---|---|---|
| 2,672,104 | 3/1954 | Clark | 106/287.13 |
| 2,672,105 | 3/1954 | Clark | 249/115 |
| 3,002,946 | 10/1961 | Thomas | 528/33 |
| 3,202,542 | 8/1965 | Poje | 428/447 |
| 3,308,080 | 3/1967 | Haenni | 523/101 |
| 3,419,514 | 12/1968 | Hadlock | 523/101 |
| 3,423,479 | 1/1969 | Hendricks | 428/156 |
| 3,536,657 | 10/1970 | Noshay et al. | 524/540 |
| 3,801,522 | 4/1974 | Vasta | 260/29.1 R |
| 4,054,705 | 10/1977 | Vassiliou | 428/458 |
| 4,064,303 | 12/1977 | Vassiliou | 428/458 |
| 4,064,313 | 12/1977 | Takiguchi | 428/447 |
| 4,121,000 | 10/1978 | Wald | 428/35 |
| 4,180,613 | 12/1979 | Vassiliou | 428/327 |
| 4,181,686 | 1/1980 | Vassiliou | 525/474 |
| 4,183,998 | 1/1980 | Vassiliou | 428/327 |
| 4,223,069 | 9/1980 | Berghmans | 428/324 |
| 4,252,702 | 2/1981 | Wald | 260/29.1 R |
| 4,262,043 | 4/1981 | Wald | 427/387 |
| 4,332,844 | 6/1982 | Hamada | 428/450 |
| 4,341,842 | 7/1982 | Lampe | 428/450 |
| 4,360,566 | 11/1982 | Shimizu | 428/450 |

Primary Examiner—Ellis P. Robinson

[57] ABSTRACT

A multilayer coated article such as a baking pan with a primer of silicone resin and silicone oil and a topcoat of silicone resin, colloidal silica and flake pigment.

11 Claims, No Drawings

MULTILAYER SILICONE COATING

BACKGROUND

The present invention relates to nonstick coated articles, and more particularly to bakeware coated with a two-layer silicone coating.

Polysiloxane homopolymer resins and more costly copolymer resins such as those reacted with epoxies are sometimes used as nondurable food release coatings in combination with substantial proportions of silicone oils. The oils are fluids which facilitate application of the coatings and improve release of burned-on food residues. Such coatings are often formulated for relatively low temperature cure. Applications for such coatings include bakery pans which can be recoated frequently or even before each use. See U.S. Pat. No. 3,419,514—Hadlock (1968), U.S. Pat. No. 3,308,080—Haenni (1967) and U.S. Pat. No. 3,801,522—Vasta (1974). The polysiloxane fluid improves release performance of such coatings, but coatings relying on the fluids have limited durability and may not be used many times without recoating. Typical applications of durable coatings are household cookware for top-of-the range cooking or oven baking which are provided with a nonstick coating that lasts for the life of the item of cookware.

U.S. Pat. Nos. 3,002,946—Thomas (1961) and 3,202,542—Poje (1965) both disclose coatings of silicone resins plus silicone oils or gums and aim for increased versatility or durability.

Special siloxanes, homopolymers and copolymers and mixtures of organopolysiloxanes with such organic materials as polyesters are sometimes used for nonstick coatings for bread pans or for consolidated materials resistant to thermal and environmental stresses such as molding compounds. See U.S. Pat. Nos. 2,672,104 and 2,672,105—both Clark (1954). U.S. Pat. No. 3,423,479—Hendricks (1969) discloses polyether coating compositions containing up to 30% polysiloxanes, and U.S. Pat. No. 3,536,657—Hoshay et al (1970) discloses coating compositions containing polyesters and polyether-polysiloxane copolymers. In both patents, the polyethers include particulate polysulfones, and the coatings are generally thermoplastic.

Blends of silicones and epoxies are the subject of U.S. Pat. Nos. 4,121,000 (1978), 4,252,702 and 4,262,043 (both 1981), all three to Wald, and of 4,223,069—Berghmans (1980) which has a three-layer coating with an epoxide primer, an epoxy-silicone intermediate coat, and a silicone topcoat. However, at relatively low pigment-to-binder ratios, the use of epoxies along with silicones has been found to be aesthetically disadvantageous.

Relatively thick silicone resin coatings with minimized tendency to crack are the subject of U.S. Pat. Nos. 4,180,613 (1979), 4,181,686 and 4,183,998 (both 1980) all three to Vassiliou.

The patents cited above are incorporated herein by reference.

A need still remains for an inexpensive, durable silicone coating with improved aesthetics that can be cured at temperatures low enough to be applicable with thin aluminum bakeware.

SUMMARY OF THE INVENTION

The present invention provides a coated article comprising a substrate coated with a coating having at least two-layers, which include a primer and a topcoat, the primer being directly in contact with the substrate and the topcoat being on the side of the primer away from the substrate, with or without intermediate coats between the primer and the topcoat, said primer consisting essentially of a silicone resin, a silicone oil and optionally pigments, and said topcoat consisting essentially of a silicone resin, colloidal silica and a flake pigment selected from metal flake, mica, and pigment-coated mica.

In preferred embodiments, separately or collectively, the substrate is aluminum, the coating has two layers, in the primer the silicone oil is present in amounts of 2 to 20% by weight based on the amount of silicone oil plus silicone resin and in the topcoat the colloidal silica is present in amounts of 4 to 15% and the flake pigment is present in amounts of 0.2-6%, both being by weight based on the amount of silicone resin, colloidal silica and flake pigment, and the silicone resin is provided as a polysiloxane precondensate having one or more of the units

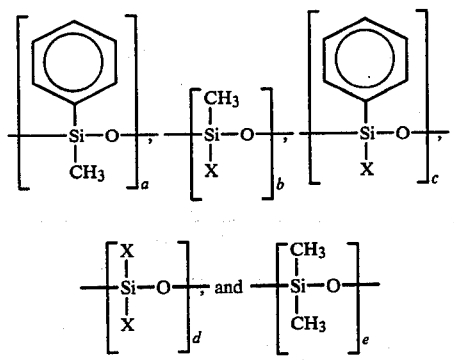

In a preferred process for producing an article coated in accordance with the invention, before the coating is applied the substrate is roughened by grit blasting, then the two layers of the coating are applied by spraying on first the primer and then, before the primer is dried, spraying on the topcoat, and then the coating is cured by heating at temperatures less than 370° C., preferably at about 290° C.

DETAILED DISCLOSURE

The silicone oil in the primer tends to exude slowly through the topcoat, improving release properties. It is omitted from the topcoat to enhance intercoat adhesion. In the topcoat, the flake segment provides aesthetic sparkle and can improve scratch resistance. The colloidal silica has various functions including gloss control.

Although one or more intermediate layers are not necessary, they can be provided with compositions similar to the topcoat to enhance durability, color, other aesthetics, etc.

Coating compositions were prepared by blending the constituents of the examples by normal paint making techniques and then spraying them sequentially, wet-on-wet, that is without drying the primer before applying the topcoat on grit-blasted aluminum muffin pans with the primer and then the topcoat. Then the coated substrate is cured at about 290° C. for 6-10 minutes. The grit blasting is not mandatory, but it improves resistance of the coating to chipping and improves the coatability of oily surfaces. The resulting coated pans generally gave satisfactory results in terms of release, wear, appearance and other factors for more than 30 cookings of blueberry muffins.

Of course, in addition to the ingredients mentioned in the claims, it is understood that the term "consisting essentially of" permits the inclusion of amounts of other ingredients which do not substantially alter the basic and novel characteristics of the invention of providing a superior nonstick coated cookware, such as solvents, pigments, extenders, coupling agents and other adjuvants. In the examples, parts, percentages and proportions are by weight except where indicated otherwise.

EXAMPLES

The pigments and solvents used in the tables can be any of several commercially available. The silicone resin used is Dow Corning 6-2230, a hydroxyl-functional methylphenyl polysiloxane precondensate. The silicone oil is Dow Corning 200 fluid, a liquid dimethyl siloxane polymer. The colloidal silica used is "Syloid" 74 amorphous silica gel from W. R. Grace & Co. The zinc octoate used is an 8% solution of the zinc compound in the form of the zinc soap of ethyl hexoic acid in mineral spirits at a solids level of 41%, made by Tenneco Chemicals Inc. The amounts of pigments are given on a dry basis. The hydroxy propyl cellulose is "Klucel" GF molecular weight 300,000, from Hercules, a suspension agent to retard settling, especially of the colloidal silica.

TABLE I

| Primer (% by wt) | | |
|---|---|---|
| Ingredient | Range | Preferred |
| silicone resin | 25–45 | 35.3 |
| silicone oil | 0.1–2 | 1.05 |
| iron-manganese oxide pigment | 3–8 | 4.84 |
| iron-aluminum-titanium pigment | 3–6 | 4.67 |
| TiO$_2$ pigment | 0–3 | 1.36 |
| bentonite | 1–4 | 1.74 |
| xylene | 3–50 | 4.57 |
| butyl acetate | 10–50 | 20.76 |
| ethylene glycol monoethyl ether acetate | 15–50 | 24.30 |

TABLE II

| Topcoat (% by wt) | | |
|---|---|---|
| Ingredient | Range | Preferred |
| silicone resin | 35–45 | 40.46 |
| zinc octoate | 1–2 | 1.64 |
| colloidal silica | 2–8 | 4.76 |
| aluminum flake | 0.5–2 | 1.08 |
| xylene | 3–50 | 3.59 |
| butyl acetate | 10–50 | 16.46 |
| ethylene glycol monoethyl ether acetate | 15–50 | 22.02 |
| N—methyl pyrrolidone | 5–20 | 9.89 |
| hydroxy propyl cellulose | 0.05–2 | 0.1 |

I claim:

1. A coated article comprising a substrate coated with a coating having at least two layers, which include a primer and a topcoat, the primer being directly in contact with the substrate and the topcoat being on the side of the primer away from the substrate, with or without intermediate coats between the primer and the topcoat,
    said primer consisting essentially of a silicone resin, a silicone oil and optionally pigments, and
    said topcoat consisting essentially of a silicone resin, colloidal silica and a flake pigment selected from metal flake, mica, and pigment-coated mica.
2. The coated article of claim 1 wherein the coating consists essentially of two layers.
3. The coated article of claim 2 wherein the substrate is metal.
4. The coated article of claim 3 wherein the substrate is aluminum.
5. The coated article of claim 1 wherein the silicone resins of the primer and of the topcoat are the cured product of a polysiloxane precondensate having one or more of the units

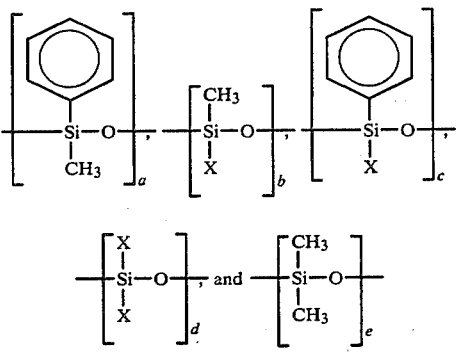

wherein
X is a functional group which allows cross-linking linking at its site, and
a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3.
6. The coated article of claim 5 wherein in the primer the silicone oil is present in amounts of 2 to 20% by weight based on the amount of silicone oil plus silicone resin.
7. The coated article of claim 5 wherein in the topcoat the colloidal silica is present in amounts of 4 to 15% and the flake pigment is present in amounts of 0.2–6%, both being by weight based on the amount of silicone resin, colloidal silica and flake pigment.
8. The coated article of claim 6 wherein the substrate is aluminum and in the topcoat the colloidal silica is present in amounts of 4 to 15% and the flake pigment is present in amounts of 0.2–6%, both being by weight based on the amount of silicone resin, colloidal silica and flake pigment.
9. The coated article of claim 8 wherein in the primer the silicone oil is present in amounts of about 3% by weight based on the amount of silicone oil plus silicone resin and in the topcoat the colloidal silica is present in amount of about 10% and the flake pigment is present in amount of about 2%, both being by weight based on the amount of silicone resin, colloidal silica and flake pigment.
10. A method of producing a coated article of claim 8 wherein, before the coating is applied the substrate is roughened by grit blasting, then the two layers of the coating are applied by spraying on first the primer and then, before the primer is dried, spraying on the topcoat, and then the coating is cured by heating at temperatures less than 370° C.
11. The method of claim 10 wherein the curing is done by heating at about 290° C.

* * * * *